(12) United States Patent
Rüf

(10) Patent No.: US 6,793,689 B2
(45) Date of Patent: Sep. 21, 2004

(54) DYED CELLULOSIC MOULDED BODIES

(75) Inventor: Hartmut Rüf, Vöcklabruck (AT)

(73) Assignee: Lenzing Aktiengesellschaft, Lenzing (AT)

( * ) Notice: Subject to any disclaimer, the term of this patent is extended or adjusted under 35 U.S.C. 154(b) by 0 days.

(21) Appl. No.: 10/071,723

(22) Filed: Feb. 8, 2002

(65) Prior Publication Data

US 2002/0189035 A1 Dec. 19, 2002

Related U.S. Application Data

(63) Continuation of application No. PCT/AT00/00216, filed on Aug. 8, 2000.

(30) Foreign Application Priority Data

Aug. 10, 1999 (AT) ................................. 1376/99

(51) Int. Cl.⁷ ................................. D06P 3/60; D06P 1/44
(52) U.S. Cl. ................................. 8/538; 8/637.1; 8/518; 8/920; 264/187
(58) Field of Search ......................... 8/538, 637.1, 518, 8/920; 264/187

(56) References Cited

U.S. PATENT DOCUMENTS 4,246,221 A 1/1981 McCorsley, III
5,766,530 A 6/1998 Kalt et al.
5,895,795 A 4/1999 Hashemzadeh

FOREIGN PATENT DOCUMENTS

| AT | 002207 | 6/1998 |
| WO | 9627035 | 9/1996 |
| WO | 9627638 | 9/1996 |
| WO | 9858015 | 12/1998 |

OTHER PUBLICATIONS

Von Dr. F. Hund, "Mischphasenpigmente mit Rutil–struktur," Angew. Chem. 74:23–27 (1962).

Dr. Hartmut Endriss, "Aktuelle anorganische Bunt–Pigmente," pp. 17–26, 94–113 and 139 (Curt R. Vincentz Verlag, Hanover, 1997).

Primary Examiner—Margaret Einsmann
(74) Attorney, Agent, or Firm—Baker Botts L.L.P.

(57) ABSTRACT

The present disclosure relates to novel dyed cellulosic moulded bodies, in particular to fibers or films, containing a heavy-metal-containing colorant, which, according to the thermal stability test described herein, reduces the rise temperature of a cellulose solution in a tertiary amine oxide by 10° C. at most, in particular by 5° C. at most. The moulded bodies according to the disclosure may be produced in accordance with the amine-oxide process.

20 Claims, 2 Drawing Sheets

DYED CELLULOSIC MOULDED BODIES

Figure 1:
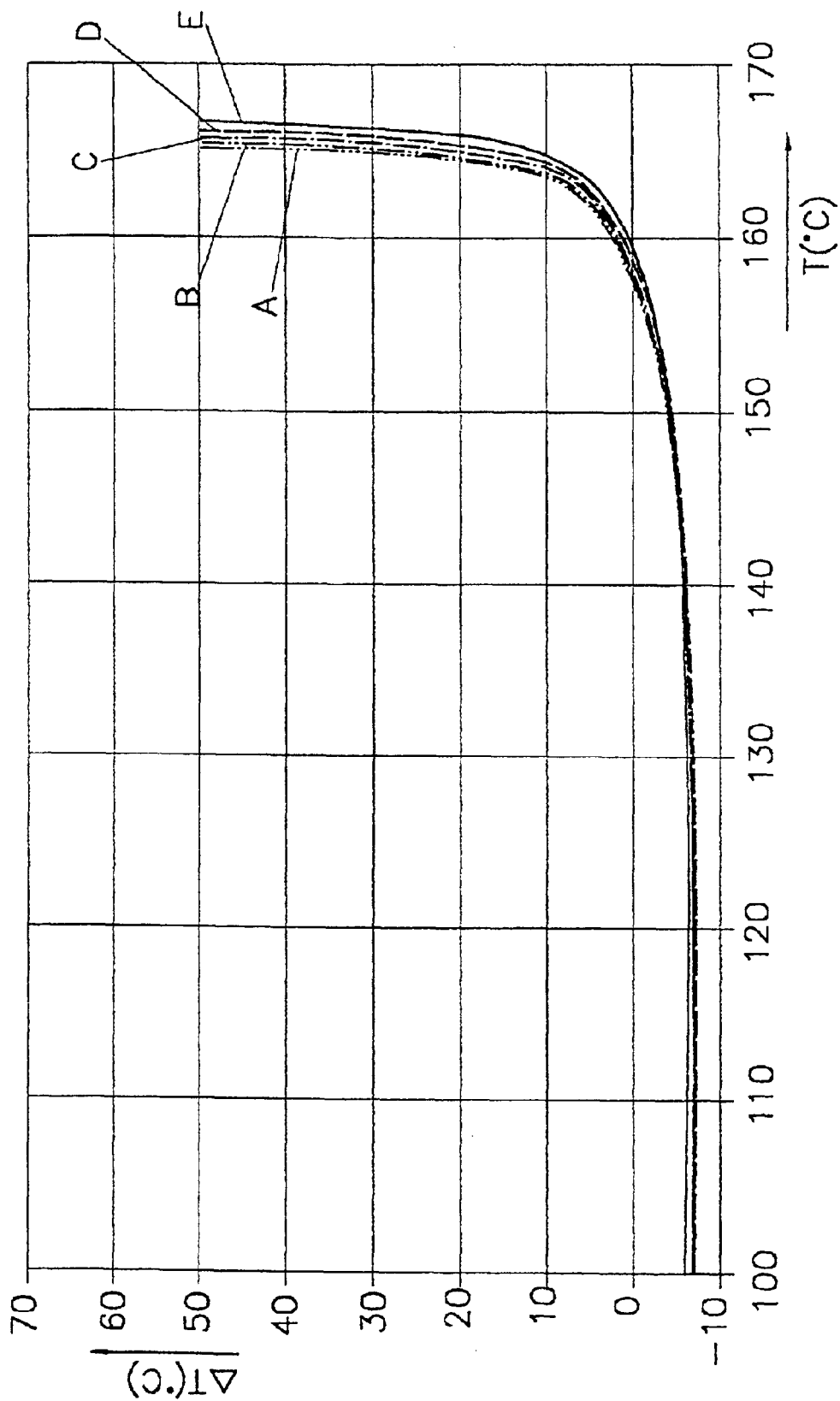

This is a continuation application of international patent application Ser. No. PCT/AT00/00216, filed Aug. 8, 2000, which published as WO 01/11121 on Feb. 15, 2001 in German and claims priority to Austrian patent application Serial No. AT-A-1376/99, filed Aug. 10, 1999.

The present invention relates to novel dyed cellulosic moulded bodies and a process for producing said moulded bodies.

For the purposes of the present description and patent claims, the term "moulded body" is to denote in particular fibres and films. If, in the following, "fibres" are mentioned, fibres, films and also other moulded bodies are understood by that.

Nowadays, synthetic fibres such as polyamide and polyester as well as viscose fibres are spun-dyed as a matter of routine. Only pigments which mostly are put on the market in the form of granulate brands or farinaceous products are used for spin dyeing.

Generally, pigments are dispersed in the polymer melt or mass. For viscose spin dyeing, the pigment preparations are metered in either in portions or to the main viscose line.

Among other things, the advantages of spin dyeing are as follows:

Large batches having the same shade of colour may be obtained.

The dyeing exhibits great fastness to wetting.

The conventional dyeing process is omitted, resulting in savings of energy and raw materials (chemicals, water) and smaller pollution by waste water.

There is no loss of dye.

The problem of splicing during dyeing (streaking) does not occur.

A homogeneous distribution of dye in the fibre and thus uniform dye penetration are achieved.

Quick changes in shades of colour are feasible during spin dosing.

As an alternative to the viscose process, a number of processes have been described in recent years, wherein cellulose, without formation of a derivative, is dissolved in an organic solvent, in a combination of an organic solvent and an organic salt, or in aqueous saline solutions. Cellulose fibres made from such solutions have received the generic name Lyocell from BISFA (The International Bureau for the Standardisation of man made Fibres). As Lyocell, BISFA defines a cellulose fibre obtained by a spinning process from an organic solvent. By "organic solvent", BISFA understands a mixture of an organic chemical and water.

A known process for producing Lyocell fibres is the so-called amine-oxide process. By evaporating surplus water, a solution of cellulose is formed in this process from a suspension of cellulose in an aqueous tertiary amine oxide, preferably N-methylmorpholine-N-oxide (NMMO), which solution of cellulose is extruded by a spinneret. The formed filaments are conducted into a precipitation bath via an air gap and are washed and dried. Such a process is described for instance in U.S. Pat. No. 4,246,221.

Due to the basic advantages of spin dyeing, the attempt has also been made to develop spin dyeing processes for Lyocell fibres. In doing so, it has been shown that realizing spin dyeing in the amine-oxide process brings about several problems.

For example, accumulations of pigments, dyes and additives (for instance, from pigment preparations) may occur due to the recycling in the amine-oxide process. Due to the thermal instability of the cellulose-amine-oxide solutions, there is also a very limited selection of colorants. Furthermore, spinning problems caused by agglomerated pigment particles have to be taken into account.

The Austrian utility model AT-GM-002 207 U1 teaches that colorants suitable for spin dyeing of Lyocell fibres have to be insoluble in the cellulose solution by more than 95% by mass, based on an originally used colorant and/or colorant precursor, respectively, and that metal-containing colorants should not be added to the suspension prior to the production of the solution, but may absolutely be added to the spinning solution if sufficient insolubility is provided.

In Table 1 of AT-GM 002 207 U1, the colorant Sandorin Blue 2 GLS20 is cited as an insoluble pigment. That colorant contains the heavy metal copper.

Surveys carried out by the inventors of the present invention have shown that, due to the lowering of the thermal stability of the cellulose solution, such pigments are unsuitable for being used in the amine oxide, despite their insolubility being sufficient in itself. However, there is a demand for being able to use colorants selected from the great range of heavy-metal-containing colorants for spin dyeing in the amine-oxide process.

Classical inorganic pigments in the ranges of yellow and orange which are ecologically questionable are cadmium sulfide and lead chromate. Other pigments are ecologically safe, such as, for example, natural and synthetic iron oxides, which are used to a great extent in the colour ranges of yellow/red/brown to black. However, it is known that iron drastically reduces the thermal stability of cellulose-amine-oxide solutions.

It is known how to use titanium dioxide for cellulose fibres. However, with cellulose fibres, titanium dioxide is not used as a colorant (white pigment), but for matting, i.e. for brightness reduction, in contrast, for instance, to its use for paints and varnishes in the painting industry. Such use of titanium dioxide in the amine-oxide process is described in WO-A-96/27638.

The object of the present invention is to provide dyed cellulosic moulded bodies, in particular of the colour ranges of yellow, orange, red and brown, which may be produced by spin dyeing with heavy-metal-containing colorants in accordance with the amine-oxide process.

According to the invention, that object is achieved by using a colorant for spin dyeing which, according to the thermal stability test described below, reduces the rise temperature of the moulding material or spinning mass, respectively, i.e. of the cellulose solution in the tertiary amine oxide, by 10° C. at most, in particular by 5° C. at most. It has been shown that even heavy-metal-containing colorants may be used in the amine-oxide process, provided that they meet that criterion.

The dyed cellulosic moulded bodies of the invention contain the heavy-metal-containing colorant preferably by from 0.20 to 10% by mass, in particular by from 2.0 to 5.0% by mass, based on the cellulose.

A colorant on the basis of titanium oxide or spinelle ($MgAl_2O_4$) is particularly suitable, with the titanium being partially replaced by one or several heavy metals and the magnesium, respectively, being partially or completely replaced by one or several heavy metals.

The invention is further based on the surprising discovery that certain inorganic coloured pigments from the group of so-called "complex inorganic coloured pigments", which contain heavy-metals, do not impair the thermal stability of the amine-oxide-cellulose solution, thereby being very suitable for use in the amine-oxide process.

In particular, the above-described problem of yellowing may be solved by means of such colorants.

Due to the known prior art, one in fact had to start out from the fact that all heavy metals whose ions exhibit two or more degrees of oxidation negatively affect the thermal stability of the system in the amine-oxide process. Since that effect on the thermal stability is catalytic, and catalysis—such as known—may be caused by very small concentrations of a catalytically active agent, the usability of a class of substances containing heavy metals as a colorant for spin dyeing in the amine-oxide process was totally unexpected.

cal characteristics. Nickel-titanium yellow is a citrine pigment. The colour of chromium-titanium yellow varies from slight to medium ochre, in accordance with the burning temperature and the particle size. Further information on the pigments used according to the invention is provided by H. Endriβ, "Aktuelle anorganische Bunt-Pigmente" (see above).

In the following, examples of suitable pigments of that kind including their Colour Indices are given. Such pigments are produced, for example, by BASF Aktiengesellschaft, Ludwigshafen, Germany, under the trade names as listed below:

| Colour Index (CI) Pigment | Doping of the titanium dioxide | BASF-trade name |
|---|---|---|
| CI Pigment Yellow 53/77788 | nickel/antimony | Sicotan Gelb K 1011 |
| CI Pigment Brown 24/77310 | chromium/antimony | Sicotan Gelb K 2001 FG |
| CI Pigment Brown 24/77310 | chromium/antimony | Sicotan Gelb K 2011 |
| CI Pigment Brown 24/77310 | chromium/antimony | Sicotan Gelb K 2107 |
| CI Pigment Brown 24/77310 | chromium/antimony | Sicotan Gelb K 2112 |
| CI Pigment Yellow 164/77899 | manganese/antimony | Sicotan Braun K 2711 |

According to H. Endriβ, "Aktuelle anorganische Bunt-Pigmente" (Curt R. Vincentz Verlag, Hannover, 1997), the complex inorganic coloured pigments are divided in two groups:

rutile pigments:

Those are titanium oxides with titanium being partially replaced by heavy metals.

spinelle pigments:

Those involve numerous compounds of the basic composition A—B$_2$—O$_4$. Many of those pigments, such as those of the type A—Fe$_2$—O$_4$, for instance, are unsuitable for the amine-oxide process.

Surprisingly, however, it has been shown that pigments on the basis of spinelle (MgAl$_2$O$_4$) in which the Mg has partially or even completely been replaced by chromophoric heavy metals are well suitable for the amine-oxide process. Herein and generally in connection with the present invention, the term "spinelle" denotes the mineral spinelle characterized by the chemical formula MgAl$_2$O$_4$.

Suitably, the heavy metal(s) is/are selected from the group consisting of nickel, chromium, manganese, antimony and cobalt and preferably is/are present in the oxidic form.

Preferably, the titanium oxides doped with heavy-metal oxides are so-called rutile pigments. With the rutile pigments, the rutile grid of the titanium dioxide absorbs nickel(II) oxide or chromium(III) oxide or manganese(II) oxide as a chromophoric component, as well as, for instance, antimony(V) oxide or niobium(V) oxide for the purpose of valence adjustment, so that a mean valance of four, such as with titanium, is reached (F. Hund, Angew. Chemie 74, 23 (1962)).

Preferred embodiments of the dyed cellulosic moulded bodies of the invention are thus characterized in that they contain a colorant on the basis of titanium oxide, with the titanium oxide being partially replaced by nickel(II) oxide, chromium(III) oxide or manganese(II) oxide and by antimony(V) oxide.

In a further preferred embodiment, the cellulosic moulded bodies contain a colorant on the basis of spinelle (MgAl$_2$O$_4$), with the magnesium being partially or completely replaced by cobalt.

When being incorporated into the host grid, the metal oxides lose their original chemical, physical and physiological characteristics. Inspite of large heavy-metal contents, the cited pigments are toxicologically flawless. Chromium/nickel/manganese/antimony are biologically inactive in the pigment. Therefore, the pigments are admissible also for use in foodstuff packings.

The dyed cellulosic moulded body of the invention is preferably a fibre or a film and is preferably produced in accordance with an amine-oxide process.

The invention also relates to a process for producing the dyed cellulosic moulded bodies of the invention, wherein a cellulose solution in an aqueous tertiary amine oxide is formed by means of a moulding tool, in particular a spinneret, and is conducted into a precipitation bath via an air gap in order to precipitate the dissolved cellulose, whereby a colorant is added to the cellulose solution and/or a precursor of the cellulose solution, and is characterized in that a heavy-metal-containing colorant is added, which, according to the thermal stability test described below, reduces the rise temperature of the cellulose solution in the tertiary amine oxide by 10° C. at most, in particular by 5° C. at most.

In the process according to the invention, a colorant on the basis of titanium oxide or spinelle (MgAl$_2$O$_4$) is preferably added, with the titanium being partially replaced by one or several heavy metals and the magnesium, respectively, being partially or completely replaced by one or several heavy metals.

The invention further relates to the use of a heavy-metal-containing colorant as a colorant for cellulosic moulded bodies, which colorant, according to the thermal stability test described below, reduces the rise temperature of a cellulose solution in a tertiary amine oxide by 10° C. at most, in particular by 5° C. at most.

Preferably, titanium oxide or spinelle (MgAl$_2$O$_4$) is used as a colorant for cellulosic moulded bodies, with the titanium contained in the titanium oxide being partially replaced by one or several heavy metals and the magnesium contained in the spinelle, respectively, being partially or completely replaced by one or several heavy metals.

In the following, the present invention will be described in more detail by way of examples.

EXAMPLE 1

Effect of Various Dyes Used According to the Invention on the Thermal Stability of NMMO Spinning Masses
Examined Dyes:

A: CI Pigment Yellow 53/77788 (Sicotan Gelb K 1011)
B: CI Pigment Yellow 24/77310 (Sicotan Gelb K 2011)
C: CI Pigment Yellow 164/77899 (Sicotan Braun K 2711)
D: CI Pigment Blue 28/77346 (Sicopal Blau K 6310; manufacturer: BASF AG, Ludwigshafen, Germany); a spinelle pigment on the basis of $MgAl_2O_4$, with magnesium being completely replaced by cobalt.

Test Procedure (Thermal Stability Test):

The tests were carried out by means of a Sikarex device (Sikarex TSC 512, manufacturer: System-Technik AG, Rüschlikon, Switzerland). Thereby, the NMMO spinning mass is thermally loaded on the Sikarex by means of a defined temperature program until an exothermal reaction (disintegration of the spinning mass) occurs.

11.5 g of pulverized spinning mass from 13.5% w/w cellulose, 75% w/w NMMO and 11.5% w/w water, to which 5% w/w each of dye A, B, C or D, based on cellulose, had homogeneously been added, were weighed into the glass charge for the Sikarex pressure vessel and, on the Sikarex, were subjected to an isothermal experiment in stages. In doing so, heating to 90° C. was accomplished in the first stage at a heating rate of 60° C./h, followed by a stabilization period, during which an adjustment to a heating rate of 6° C./h took place. In the following, heating to 180° C. was accomplished in a second stage by means of that heating rate. The temperature of the spinning mass in the Sikarex was measured as well.

For comparative reasons, an NMMO spinning mass E which had not been mixed with a dye was also examined on the Sikarex under the same conditions (blank value).

The temperature profiles measured for the various spinning masses A–E are illustrated in FIG. 1, whereby the temperature T of the heating jacket is inserted as ° C. on the abscissa whereas the difference in temperature $\Delta T$ between the sample and the heating jacket is inserted as ° C. on the ordinate.

The term "rise temperature" denotes that temperature of the heating jacket at which the temperature of the spinning mass exceeds the temperature of the heating jacket by 10° C., due to exothermal reactions. The spinning mass without any added colorants (curve E) has a rise temperature of about 165° C. Adding the colorants A, B, C and D reduced the rise temperature of the spinning mass only by about 2° C.

The results show that the thermal stability of a cellulose-NMMO spinning mass is not affected by adding 5% each of one of the colorants used according to the invention.

EXAMPLE 2

The proceeding was equal to that of example 1, however, instead of the dyes used according to the invention, the following different heavy-metal-containing pigments were used:

F: bismuth vanadate—CI Pigment Yellow 184 (Sicopal Gelb K 1160 FG)
G: copper phthalocyanine—CI Pigment Blue 15:3 (Aquarinblue 3 G; manufacturer: Tennants Textile Colours Ltd., Belfast, Northern Ireland)

Figure 2:
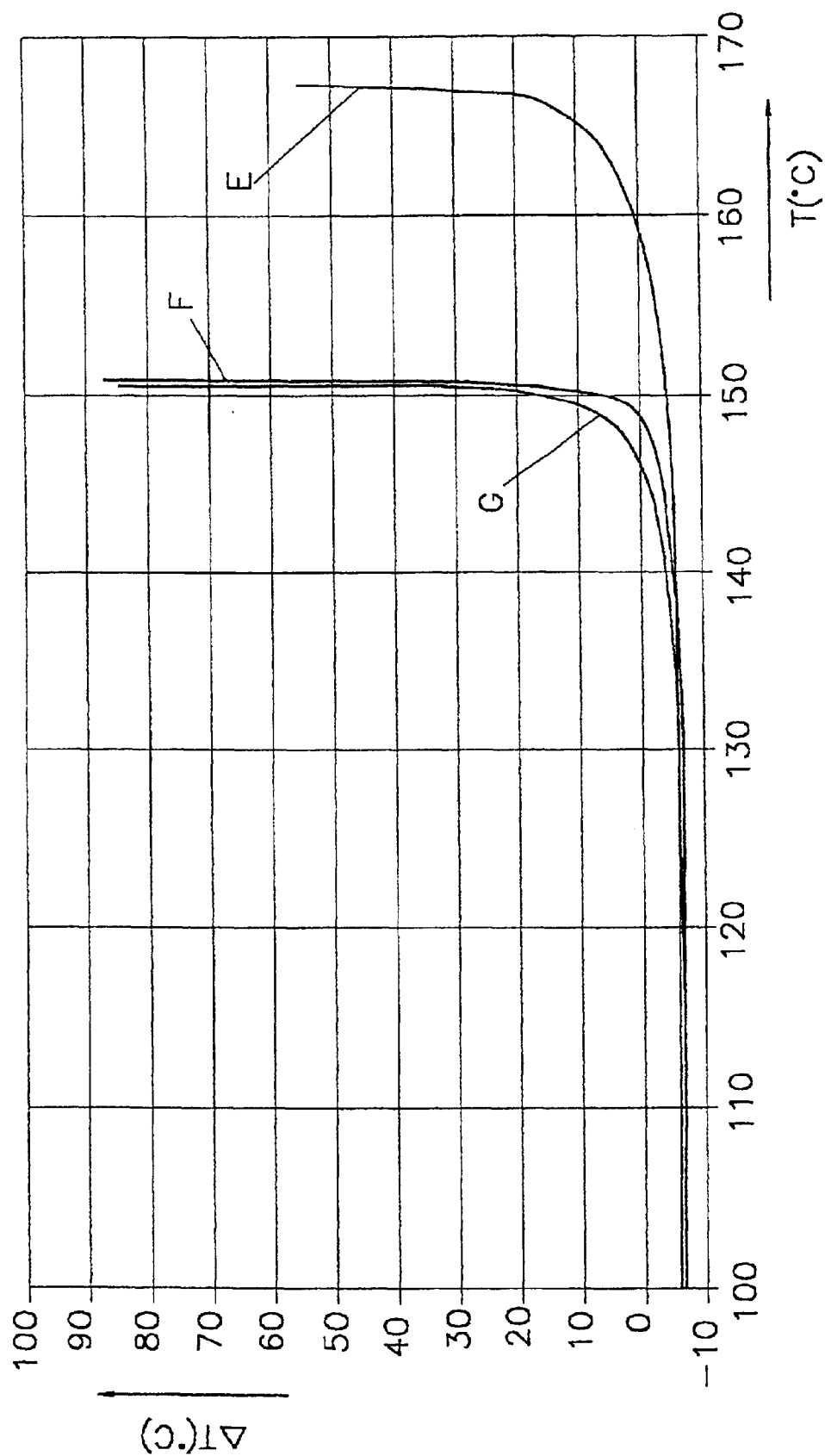

The results are shown in FIG. 2, whereby the jacket temperature T is inserted as ° C. on the abscissa whereas the difference in temperature $\Delta T$ between the sample and the jacket is inserted as ° C. on the ordinate.

FIG. 2 shows that the colorants F and G reduce the rise temperature of the spinning mass from 165° C. (curve E) to 150° C. (curve F) or to 149° C. (curve G), respectively. They reduce the rise temperature by 15° C. or by 16° C., respectively. The examined pigments thus catalyze the thermal degradation of the spinning mass in contrast to the pigments used according to the invention and therefore are unsuitable as dyes in the amine-oxide process.

EXAMPLE 3

The spinning masses mixed with dye A, B, C or D according to example 1 were spun to fibres of 1.7 dtex at 115° C. With good spinning behaviour, citrine fibres (dye A), ochre fibers (dye B), brown fibres (dye C) and blue fibres (dye D) were obtained.

I claim:

1. A dyed cellulosic molded body produced by (i) dissolving cellulose in an aqueous tertiary amine oxide to form a cellulose solution, wherein the cellulose solution further comprises a colorant on the basis of a compound selected from the group consisting of titanium oxide and spinelle ($MgAl_2O_4$) wherein the titanium contained in the titanium oxide is partially replaced by one or more heavy metals and the magnesium contained in the spinelle is partially or completely replaced by one or more heavy metals and wherein the colorant in the cellulose solution does not reduce the rise temperature of the cellulose solution by more than 10° C.; (ii) forming the cellulose solution by means of a molding tool and (iii) precipitating the cellulose in the formed cellulose solution to produce a cellulosic molded body.

2. A dyed cellulosic molded body according to claim 1, which contains the heavy-metal-containing colorant by from 0.20 to 10% by mass based on the cellulose.

3. A dyed cellulosic molded body according to claims 1 or 2, wherein the one or more heavy metals are selected from the group consisting of nickel, chromium, manganese, antimony and cobalt.

4. A dyed cellulosic molded body according to claims 1 or 2, wherein the one or more heavy metals are present in an oxidic form.

5. A dyed cellulosic molded body according to claim 4, which contains a colorant on the basis of titanium dioxide, with the titanium oxide being partially replaced by nickel(II) oxide and antimony (V) oxide.

6. A dyed cellulosic molded body according to claim 4, which contains a colorant on the basis of titanium dioxide, with the titanium oxide being partially replaced by chromium (III) oxide and antimony (V) oxide.

7. A dyed cellulosic molded body according to claim 4, which contains a colorant on the basis of titanium dioxide, with the titanium oxide being partially replaced by manganese(II) oxide and antimony (V) oxide.

8. A dyed cellulosic molded body according to claim 4, which contains a colorant on the basis of spinelle ($MgAl_2O_4$), with the magnesium being partially or completely replaced by cobalt.

9. A dyed cellulosic molded body according to claim 1 or 2 which is a fiber or a film.

10. A dyed cellulosic molded body according to claim 1 wherein the colorant is spinelle wherein the magnesium is completely replaced with one or more heavy metals.

11. A dyed cellulosic molded body according to claim 1 wherein the colorant does not reduce the rise temperature of the cellulosic solution by more than 5° C.

12. A dyed cellulosic molded body according to claim 2 which contains the heavy-metal-containing colorant by from 2.0 to 5.0% by mass based on the cellulose.

13. A process for producing dyed cellulosic molded bodies comprising the steps of (i) preparing a cellulose solution by dissolving cellulose in an aqueous tertiary amine oxide, wherein the cellulose solution further comprises a heavy-metal containing colorant on the basis of a compound selected from the group consisting of titanium oxide and spinelle ($MgAl_2O_4$), wherein the titanium contained in the titanium oxide is partially replaced with one or more heavy metals and the magnesium contained in the spinelle is partially or completely replaced by one or more heavy metals, and wherein the colorant does not reduce the rise temperature of the cellulosic solution in the tertiary amine oxide by more than 10° C.; (ii) forming the cellulose solution by means of a molding tool, and (iii) conducting said formed cellulose solution via an air gap into a precipitation bath in order to precipitate the dissolved cellulose.

14. A process for producing dyed cellulosic molded bodies according to claim 13 wherein said moulding tool is a spinneret.

15. A process for producing dyed cellulosic molded bodies according to claim 13 wherein the colorant is added to a precursor of the cellulose solution.

16. A process for producing dyed cellulosic molded bodies according to claim 13 wherein the colorant is spinelle wherein the magnesium is completely replaced with one or more heavy metals.

17. A process for producing dyed cellulosic molded bodies according to claim 13 wherein the colorant does not reduce the rise temperature of the cellulose solution by more than 5° C.

18. A method of using a heavy-metal-containing colorant on the basis of a compound selected from the group consisting of titanium oxide and spinelle ($MgAl_2O_4$) as a colorant for cellulosic molded bodies wherein the titanium contained in the titanium oxide is partially replaced by one or more heavy metals and the magnesium contained in the spinelle is completely replaced with one or more heavy metals comprising preparing a cellulose solution comprising cellulose dissolved in an aqueous tertiary amine oxide and the colorant; forming the cellulose solution and precipitating the cellulose in the formed cellulose solution to produce a cellulosic molded body.

19. A method of using a heavy-metal-containing colorant on the basis of a compound selected from the group consisting of titanium oxide and spinelle ($MgAl_2O_4$) as a colorant for cellulosic molded bodies wherein the titanium contained in the titanium oxide is partially replaced with one or more heavy metals and the magnesium contained in the spindle is partially or completely replaced with one or more heavy metals comprising the step of preparing a cellulose solution comprising the colorant and cellulose dissolved in an aqueous tertiary amine oxide, wherein the colorant does not reduce the rise temperature of the cellulose solution by more than 10° C.

20. A method of using a heavy-metal-containing colorant on the basis of a compound selected from the group consisting of titanium oxide and spinelle ($MgAl_2O_4$) as a colorant for cellulosic molded bodies comprising preparing a cellulose solution comprising cellulose dissolved in an aqueous tertiary amine oxide and the colorant, forming the cellulose solution, and precipitating the cellulose in the formed cellulose solution to produce a cellulosic molded body, wherein the titanium contained in the titanium oxide is partially replaced by one or more heavy metals and the magnesium contained in the spinelle is partially or completely replaced by one or more heavy metals and wherein the colorant does not reduce the rise temperature of the cellulosic solution in a tertiary amine oxide by more than 5° C.

* * * * *